(12) United States Patent
Bahattab et al.

(10) Patent No.: US 10,894,888 B2
(45) Date of Patent: Jan. 19, 2021

(54) DUST REPELLANT AND ANTI-REFLECTIVE INORGANIC COATING AND METHOD FOR PREPARING THE SAME

(71) Applicants: King Abdulaziz City for Science and Technology, Riyadh (SA); Fraunhofer Institute for Silicate Research ISC, Wurzburg (DE)

(72) Inventors: Mohammed Abdullah Bahattab, Riyadh (SA); Walther Glaubitt, Wurzburg (DE); Mark Mirza, Wurzburg (DE); Mohammed I Alhussani, Riyadh (SA)

(73) Assignees: KING ABDULAZIZ CITY FOR SCIENCE AND TECHNOLOGY, Riyadh (SA); FRAUNHOFER INSTITUTE FOR SILICATE RESEARCH ISC, Wurzburg (DE)

( * ) Notice: Subject to any disclaimer, the term of this patent is extended or adjusted under 35 U.S.C. 154(b) by 261 days.

(21) Appl. No.: 14/955,049

(22) Filed: Dec. 1, 2015

(65) Prior Publication Data

US 2017/0152387 A1    Jun. 1, 2017

(51) Int. Cl.
  *C09D 5/00* (2006.01)
  *C09D 1/00* (2006.01)
  *C03C 17/25* (2006.01)
  *C09D 5/16* (2006.01)

(52) U.S. Cl.
  CPC .............. *C09D 5/006* (2013.01); *C03C 17/25* (2013.01); *C09D 1/00* (2013.01); *C09D 5/1681* (2013.01); *C03C 2217/213* (2013.01); *C03C 2217/70* (2013.01); *C03C 2217/732* (2013.01); *C03C 2218/111* (2013.01); *C03C 2218/32* (2013.01)

(58) Field of Classification Search
  None
  See application file for complete search history.

(56) References Cited

U.S. PATENT DOCUMENTS

| | | | | |
|---|---|---|---|---|
| 6,156,409 A | * | 12/2000 | Doushita | ................. B32B 27/14 427/190 |
| 2012/0024312 A1 | * | 2/2012 | Wilson | ..................... C09D 7/67 134/1 |

OTHER PUBLICATIONS

"Anti-soiling effect of porous SiO2 coatings prepared by sol-gel processing", May 19, 2011. Glaubitt et al.*

(Continued)

*Primary Examiner* — Colin W. Slifka
(74) *Attorney, Agent, or Firm* — Steven M. Shape; Dennemeyer & Associates, LLC

(57) ABSTRACT

The invention provides a dust repellant and anti-reflective inorganic coating and the method for preparing the coating. The dust repellant and anti-reflective inorganic coating includes nano-porous silica ($SiO_2$) network of about 5 nm to about 35 nm and is characterized by cracks. The method of preparing the dust repellant and anti-reflective inorganic coating on a substrate includes mixing of aqueous $SiO_2$ solution with a solvent. The aqueous $SiO_2$ solution with the solvent is stirred to form a solution. The solution is coated on the substrate to form a film on the surface of the substrate. Thereafter, the film is annealed by heating the film to a temperature of about 500° C. to about 700° C. within a period of about 2 minutes to about 2 hours. Finally, the film is allowed to cool down.

8 Claims, 8 Drawing Sheets

(56) References Cited

OTHER PUBLICATIONS

"Anti-soiling effect of porous SiO2 coatings prepared by sol-gel processing", May 19, 2011. Glaubitt et al. (Year: 2011).*

* cited by examiner

|  | upright test stand | | tilted test stand | |
|---|---|---|---|---|
|  | thin coating | thick coating | thin coating | thick coating |
| K001 | KTS035 | KTS046 | KTS039 | KTS050 |
| K002 | KTS063 | KTS073 | KTS067 | KTS078 |
| K003 | KTS009 | KTS018 | KTS014 | KTS023 | position of sample cut used for evaluation

FIG.7

| | Netmeasurement on cut-out samples from Riyadh after 1 year exposure (mean values) | | | | | |
|---|---|---|---|---|---|---|
| Wavelength | T_UV | T_Vis | T_E | Delta T_Vis | Delta T_UV | Delta T_E |
| 90° uncoated | 61,9% | 69,3% | 70,6% | | | |
| K001-KTS035-90°-thin | 70,6% | 77,8% | 78,3% | 8,5% | 8,7% | 7,7% |
| K001-KTS046-90° - thick | 69,5% | 76,7% | 78,8% | 7,4% | 7,6% | 8,2% |
| K002-KTS063-90° - thin | 71,1% | 77,0% | 77,5% | 7,7% | 9,2% | 6,9% |
| K002-KTS073-90° - thick | 73,4% | 79,7% | 81,4% | 10,4% | 11,5% | 10,8% |
| K003-KTS009-90° - thin | 70,0% | 76,8% | 77,4% | 7,5% | 8,1% | 6,8% |
| K003-KTS018-90° - thick | 73,4% | 78,6% | 80,1% | 9,3% | 11,5% | 9,5% |
| tilted° uncoated | 45,7% | 53,2% | 54,0% | | | |
| K001-KTS039-tilted° - thin | 55,3% | 62,1% | 62,4% | 8,9% | 9,6% | 8,4% |
| K001-KTS050-tilted° - thick | 56,5% | 63,3% | 64,8% | 10,1% | 10,8% | 10,8% |
| K002-KTS067-tilted° - thin | 53,5% | 59,9% | 60,3% | 6,7% | 7,8% | 6,3% |
| K002-KTS078-tilted° - thick | 56,2% | 62,6% | 63,8% | 9,4% | 10,5% | 9,8% |
| K003-KTS014-tilted° - thin | 52,4% | 59,6% | 60,1% | 6,4% | 6,7% | 6,1% |
| K003-KTS023-tilted° - thick | 57,4% | 63,0% | 64,2% | 9,8% | 11,7% | 10,2% |

FIG.8

DUST REPELLANT AND ANTI-REFLECTIVE INORGANIC COATING AND METHOD FOR PREPARING THE SAME

FIELD OF THE INVENTION

The invention generally relates to coatings for substrates. More specifically, the invention relates to a dust repellant and anti-reflective inorganic coating and method for preparing the same.

BACKGROUND OF THE INVENTION

Generally, transparency of architectural glass and appearance of façade elements are significantly deteriorated by soiling. The soiling on glass surfaces reduces the efficiency of photovoltaic modules and solar-thermal collectors. The glass surfaces require a mechanically assisted cleaning due to the soiling. Typically, contaminations include dust particles and adhesion of the contaminations is mediated by a thin greasy film that acts as an adhesive. Single particles may easily be removed by water or wind, whereas deposits built up by aggregation of particles tend to be more permanent.

Self-cleaning surfaces are also used since certain plant surfaces were recognized to remain astonishingly unstained in a natural environment. For example, a lotus effect is based on the fact that water is repelled from micro-patterned hydrophobic leaf surfaces. Due to the lotus effect, attachment of solid contaminations is reduced to such surface topographies and the solid contaminations are easily removed by water droplets rolling off. However, preparation of large patterned surfaces on a commercial scale is difficult and expensive. The microstructures in dimensions observed on plant surfaces are apt to scatter light such as lotus surfaces, thus such self-cleaning surfaces cannot be used for solar appliances.

Improved surfaces that exhibit a complete contrary wetting behavior such as water on super-hydrophilic Titanium dioxide ($TiO_2$) surface undercuts contaminations and allows the contaminations to be rinsed off more easily. This effect is aided by a photo-catalytic degradation of organic contaminants under Ultra-Violet (UV) irradiation. However, this effect fails for inorganic materials. Additionally, the surface reflectivity due to the high-index material $TiO_2$ is required to be considered for solar panels.

There are certain other type of coating such as an anti-static polymeric film with a sufficiently low surface energy that repels dust, soil and grime. Such coatings can be used for glass surfaces, however, the coating may be washed off easily by rain.

Certain anti-soiling nanostructured coatings with antireflective properties are films that can be deposited on large areas by sol-gel processing. However, the ingredients of the anti-soiling nanostructured coatings with antireflective properties are considerably more expensive.

Thus, there is a need to develop an improved coating material with anti-soiling and anti-reflective properties which are cost effective, easy to prepare and easy to coating on surfaces.

BRIEF DESCRIPTION OF THE FIGURE

The accompanying figures together with the detailed description below forms part of the specification and serves to further illustrate various embodiments and to explain various principles and advantages all in accordance with the invention.

FIG. 7 illustrates sample layouts on a test stand during transmission measurement by a Diode-Array Spectrometer.

FIG. 8 tabulates an overview of the transmission measurements evaluated by T-v acc. EN410/ISO 9050:200.

DETAILED DESCRIPTION OF THE INVENTION

Before describing in detail embodiments that are in accordance with the invention, it should be observed that the embodiments reside primarily for a dust repellant and anti-reflective inorganic coating and method for preparing the dust repellant and anti-reflective inorganic coating.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Generally speaking, pursuant to various embodiments, the invention provides a dust repellant and anti-reflective inorganic coating and a method of preparing the coating. The dust repellant and anti-reflective inorganic coating includes nano-porous silica network of about 5 nanometer (nm) to about 35 nm. The dust repellant and anti-reflective inorganic coating is characterized by cracks. The cracks are about 0.3 micrometer (µm) to about 3 µm in length and about 0.01 µm to 0.05 µm in width.

The method of preparing the dust repellant and anti-reflective inorganic coating on a substrate includes mixing of aqueous silica ($SiO_2$) solution with a solvent. The silica is about 5 nm to about 35 nm in size. The aqueous $SiO_2$ solution with the solvent is stirred to form a solution. The solution is coated on the substrate to form a film on the surface of the substrate. Thereafter, the film is annealed by heating the film to a temperature of about 500 degree Celsius (° C.) to about 700° C. within a period of about 2 minutes to about 2 hours. Finally, the film is allowed to cool down.

Figure 1:
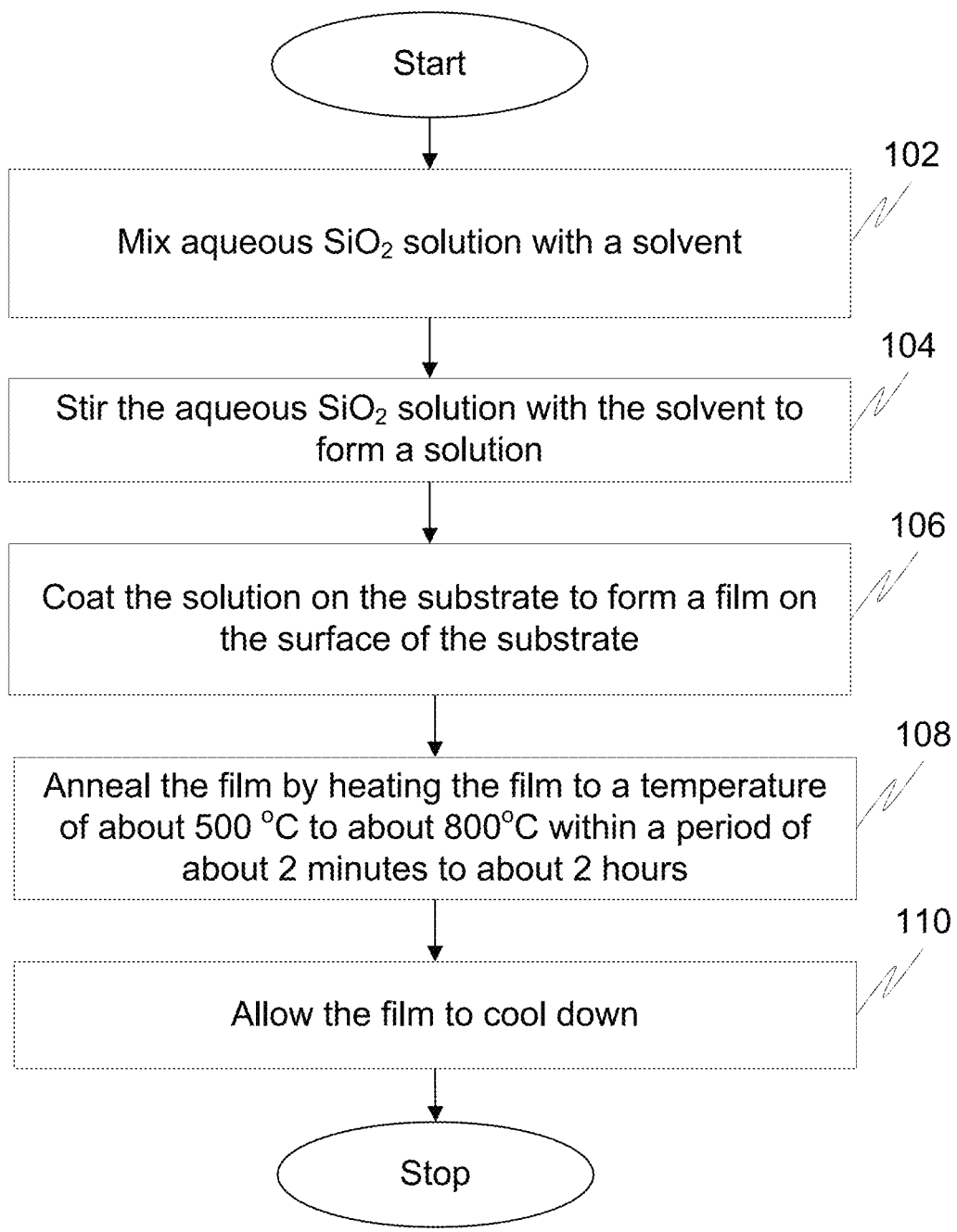
FIG. 1 illustrates a flow diagram of a method for preparing a dust repellant and anti-reflective inorganic coating in accordance with an embodiment of the invention.

FIG. 1 illustrates a flow diagram of a method for preparing a dust repellant and anti-reflective inorganic coating in accordance with an embodiment of the invention. The dust repellant and anti-reflective inorganic coating is prepared using sol-gel processing.

At step 102, aqueous silica ($SiO_2$) solution is mixed with a solvent, wherein the size of $SiO_2$ is about 5 nm to about 35 nm. In a preferred embodiment, the size of $SiO_2$ is 15 nm. The solvent mixed with the aqueous $SiO_2$ is one of, but not limited to, water, methanol, ethanol, 2-propanol, n-propanol, 2-methoxythanol, 2-ethoxyethanol, 2-butoxyethanol, 1-methoxy-2-propanol, acetone, 4-Methyl-2-pentanone. The solvent mixed with the aqueous $SiO_2$ solution is in a concentration of about 0.5 weight percentage (wt %) to about 80 wt %.

Moving on, at step 104, the aqueous $SiO_2$ solution is stirred with the solvent to form a solution. In an embodiment, the aqueous $SiO_2$ solution with the solvent is stirred to form the solution for period of at least 1 hour.

At step 106, the solution is coated on the substrate to form a film on the surface of the substrate. In an embodiment, the substrate is glass. Before coating the substrate with the solution, the substrate is cleaned using alkaline detergent. In an embodiment, the solution is coated on the substrate to form the film on the surface of the substrate using a dip coating technique. Before using dip coating technique, the surface of the substrate is additionally blown off with compressed air. A dip coating device with a speed control is used to coat the solution on the substrate. With a pre-defined withdrawal speed, a desired wet-film thickness of the coating is achieved. After coating, the wet-film is allowed to dry under atmospheric conditions.

Thereafter, at step 108, the film is annealed by heating the film to a temperature of about 500 degree Celsius (° C.) to about 700° C. within a period of about 2 minutes to about 2 hours. The substrate with the film is placed in a vented furnace while annealing.

Finally, at step 110, the film is allowed to cool down. The film is allowed to cool down to the room temperature of about 24° C. to about 27° C. In an embodiment, the film is allowed to cool down after holding the film at a temperature about 500° C. to about 700° C. for a period of about 2 minutes to about 60 minutes.

Figure 2:
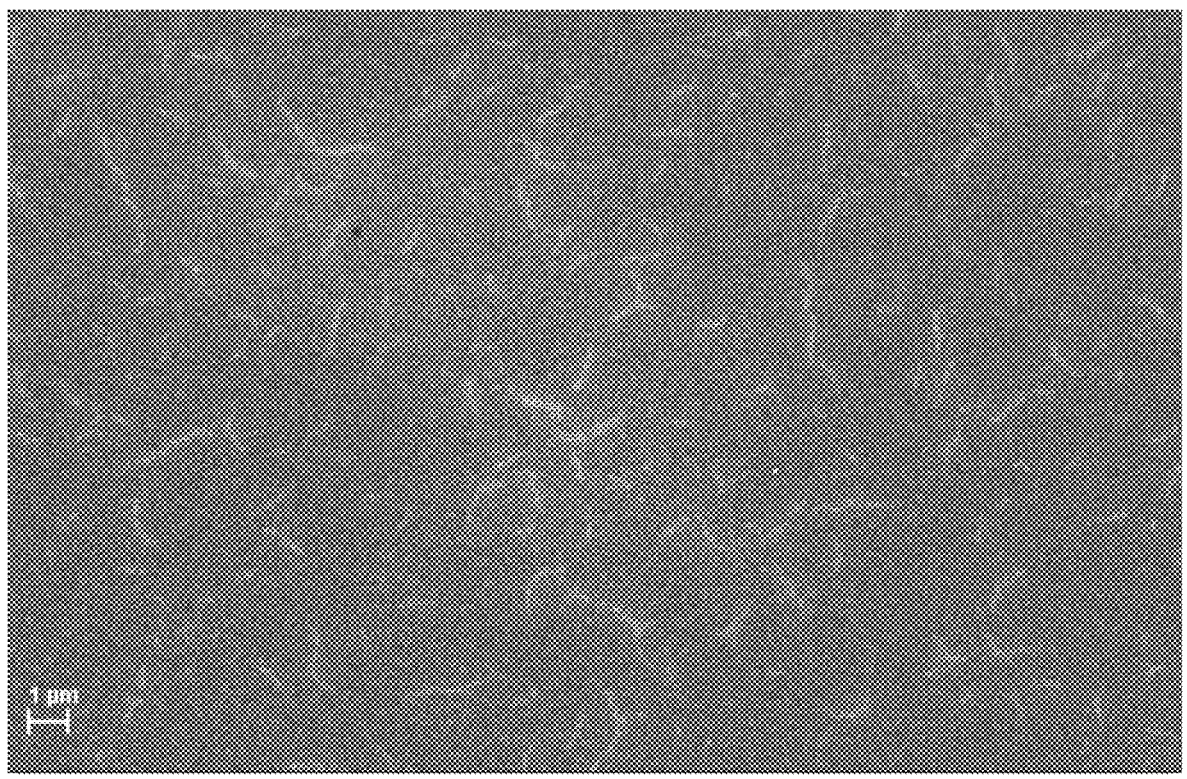
FIG. 2 depicts a film with a microstructure that is characterized by cracks covering the whole surface during a Scanning Electron Microscopy (SEM) investigation.
Figure 3:
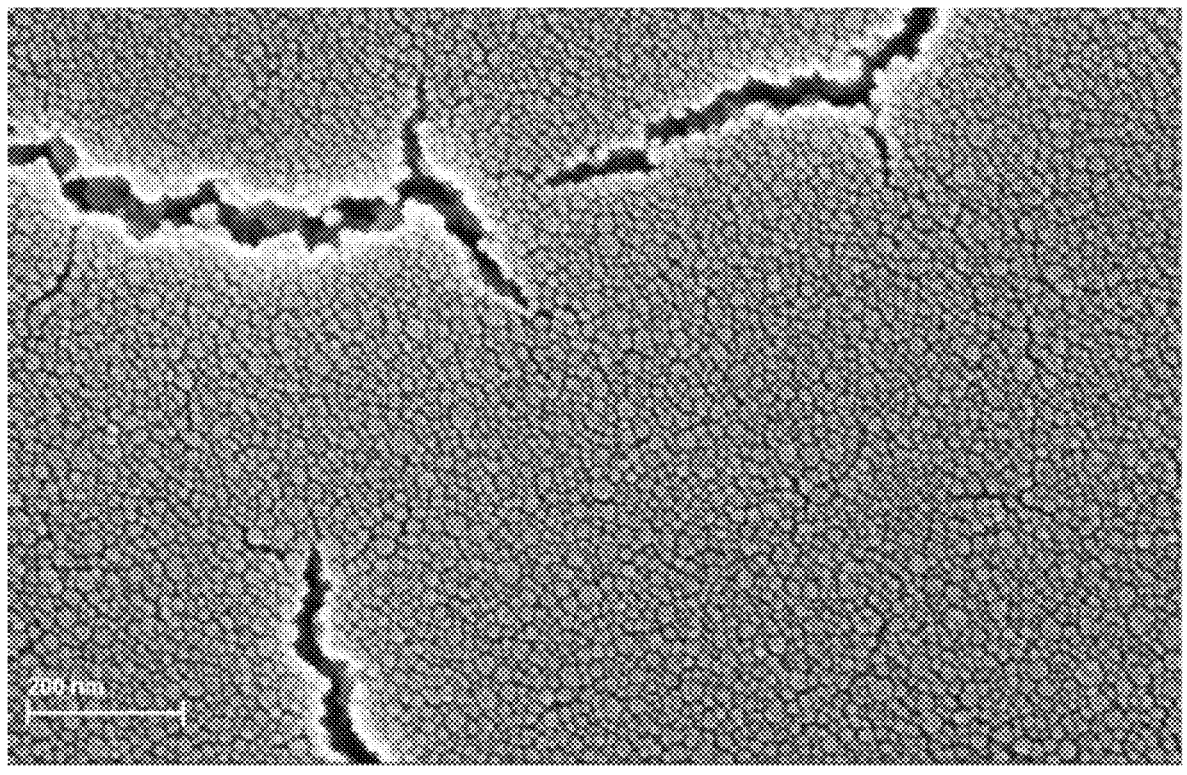
FIG. 3 depicts a film with cracks of up to 2 µm length and 0.03 µm wide during the SEM investigation.

Cracks are formed on the coating by rapid annealing of the film at about 500° C. to about 700° C. and subsequent rapid cooling to room temperature. The anti-reflective property of the dust repellant silica coating on the substrate is due to the crack. The cracks are about 0.3 micrometer (μm) to about 3 μm in length and about 0.01 μm to 0.05 μm in width. In an embodiment, the cracks are about 2 μm in length and about 0.03 μm in width. When the film is characterized by Scanning Electron Microscopy (SEM), the structure of nanoporous matrix as well as the particle density contributes to the anti-reflective and anti-soiling properties of the coating. FIG. 2 depicts the film with a microstructure that is characterized by cracks covering the whole surface during the SEM investigation. FIG. 3 depicts the film with cracks of up to 2 μm length and 0.03 μm wide during the SEM investigation.

Preparation of a Dust Repellant and Anti-Reflective Silica $SiO_2$ Coating on a Glass Substrate Working Example 1

In this working example, 160 grams (g) of aqueous solution of $SiO_2$ and 640 g of 2-propanol are poured together and continuously stirred for a period of at least 1 hour to form a solution. The $SiO_2$ in the aqueous solution is 8 nm in size. Before the solution is coated on glass substrates, the glass substrates are cleaned in a laboratory dishwasher using an alkaline detergent. The glass surfaces are additionally blown off with compressed air before coating with the solution. A dip coating device with speed control is used for coating the solution on the glass substrates. After dip coating, a wet film is formed on the surface of the glass substrate. The wet film is allowed to dry in an ambient condition. Thereafter, the film is annealed by placing the glass substrates with the films in a vented furnace at room temperature and heating the films to 500° C. within 2 hours. The temperature is held for 30 minutes and then the vented furnace is allowed to cool down overnight.

Working Example 2

In this working example, 160 grams (g) of aqueous solution of $SiO_2$ and 640 g of 2-propanol are poured together and continuously stirred for a period of at least 1 hour to form a solution. The $SiO_2$ in the aqueous solution is 8 nm in size. Before the solution is coated on glass substrates, the glass substrates are cleaned in a laboratory dishwasher using an alkaline detergent. The glass surfaces are additionally blown off with compressed air before coating with the solution. A dip coating device with speed control is used for coating the solution on the glass substrates. After dip coating, wet films are formed on the surfaces of the glass substrates. The wet films are allowed to dry in ambient conditions. Thereafter, the films are annealed by placing the glass substrates with the films in a vented furnace at room temperature and increasing the temperature of the furnace to 700° C. within 2 hours. The temperature is held for 2 minutes and then the glass substrates with the films are removed from the furnace. Subsequently, the films are allowed to cool down.

Working Example 3

In this working example, 160 grams (g) of aqueous solution of $SiO_2$ and 640 g of 2-propanol are poured together and continuously stirred for a period of at least 1 hour to form a solution. The $SiO_2$ in the aqueous solution is 10 nm in size. Before the solution is coated on glass substrates, the glass substrates are cleaned in a laboratory dishwasher using an alkaline detergent. The glass surfaces are additionally blown off with compressed air before coating with the solution. A dip coating device with speed control is used for coating the solution on the glass substrates. After dip coating, a wet film is formed on the surface of the glass substrate. The wet film is allowed to dry in an ambient condition. Thereafter, the film is annealed by placing the glass substrates with the films in a vented furnace at room temperature and heating the films to 500° C. within 2 hours. The temperature is held for 30 minutes and then the vented furnace is allowed to cool down overnight.

Working Example 4

In this working example, 160 grams (g) of aqueous solution of $SiO_2$ and 640 g of 2-propanol are poured together and continuously stirred for a period of at least 1 hour to form a solution. The $SiO_2$ in the aqueous solution is 10 nm in size. Before the solution is coated on glass substrates, the glass substrates are cleaned in a laboratory dishwasher using an alkaline detergent. The glass surfaces are additionally blown off with compressed air before coating with the solution. A dip coating device with speed control is used for coating the solution on the glass substrates. After dip coating, wet films are formed on the surfaces of the glass substrates. The wet films are allowed to dry in ambient conditions. Thereafter, the films are annealed by placing the glass substrates with the films in a vented furnace at room temperature and increasing the temperature of the furnace to 700° C. within 2 hours. The temperature is held for 2 minutes and then the glass substrates with the films are removed from the furnace. Subsequently, the films are allowed to cool down.

Working Example 5

In this working example, 160 grams (g) of aqueous solution of $SiO_2$ and 640 g of 2-propanol are poured together and continuously stirred for a period of at least 1 hour to form a solution. The $SiO_2$ in the aqueous solution is 15 nm in size. Before the solution is coated on glass substrates, the glass substrates are cleaned in a laboratory dishwasher using an alkaline detergent. The glass surfaces are additionally blown off with compressed air before coating with the solution. A dip coating device with speed control is used for coating the solution on the glass substrates. After dip coating, a wet film is formed on the surface of the glass substrate. The wet film is allowed to dry in an ambient condition. Thereafter, the film is annealed by placing the glass substrates with the films in a vented furnace at room temperature and heating the films to 500° C. within 2 hours. The temperature is held for 30 minutes and then the vented furnace is allowed to cool down overnight.

Working Example 6

In this working example, 160 grams (g) of aqueous solution of $SiO_2$ and 640 g of 2-propanol are poured together and continuously stirred for a period of at least 1 hour to form a solution. The $SiO_2$ in the aqueous solution is 15 nm in size. Before the solution is coated on glass substrates, the glass substrates are cleaned in a laboratory dishwasher using an alkaline detergent. The glass surfaces are additionally blown off with compressed air before coating with the solution. A dip coating device with speed control is used for coating the solution on the glass substrates. After dip coating, wet films are formed on the surfaces of the glass substrates. The wet films are allowed to dry in ambient conditions. Thereafter, the films are annealed by placing the glass substrates with the films in a vented furnace at room temperature and increasing the temperature of the furnace to 700° C. within 2 hours. The temperature is held for 2 minutes and then the glass substrates with the films are removed from the furnace. Subsequently, the films are allowed to cool down.

Figure 4:
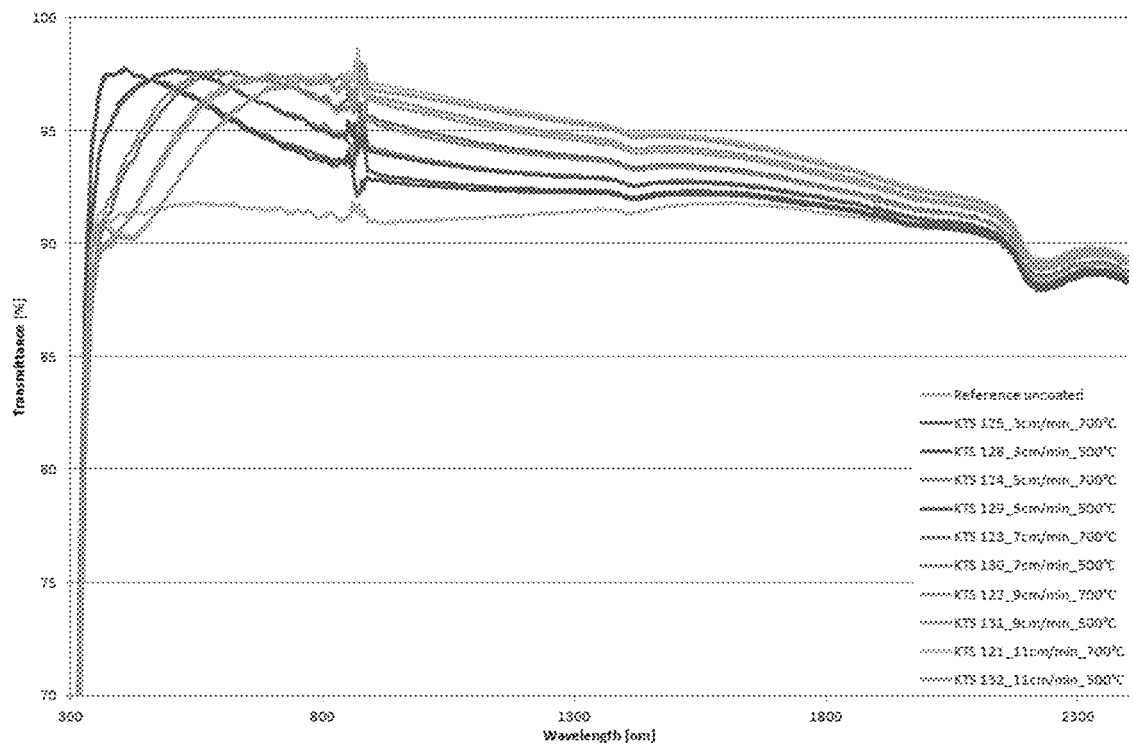
FIG. 4 represents significant differences in transmittance between coated glasses and uncoated glasses.

FIG. 4 represents significant differences in transmittance between coated glasses and uncoated glasses.

Several transmittance tests were performed on the dust repellent and anti-reflective silica coating on glass panels. Several test sites were established and equipped with coated and uncoated glass samples each fixed in an upright angle (90°) and tilted angle (24°). All samples were monitored with a light meter sensor to ensure correct readings. All readings were documented in the regular reports. After one year, all exposed coated glass samples were cut out and analyzed using UV/Vis spectroscopy for more precise information.

Figure 5:
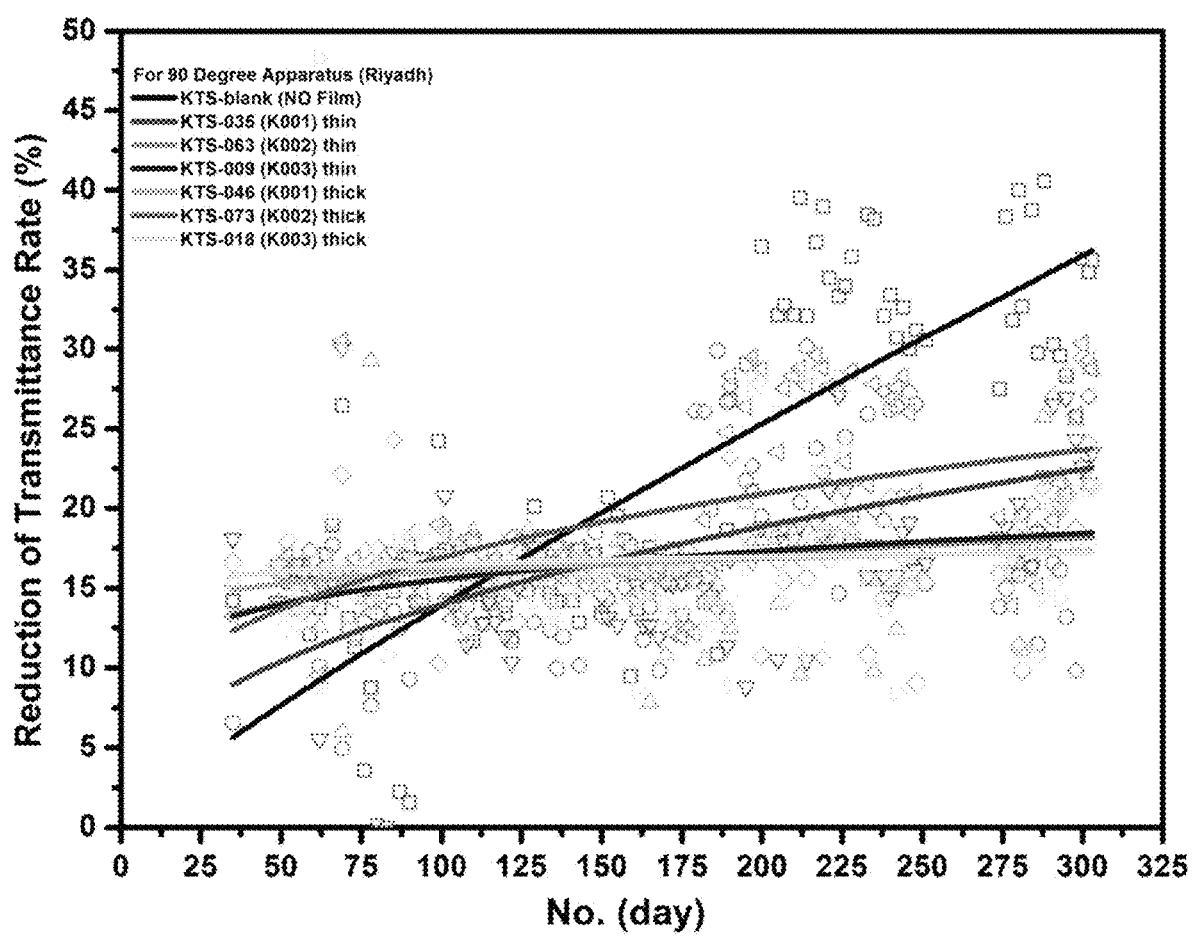
FIG. 5 represents light meter readings (Upright, 90°) of coated and uncoated samples during nearly one year of exposure.
Figure 6:
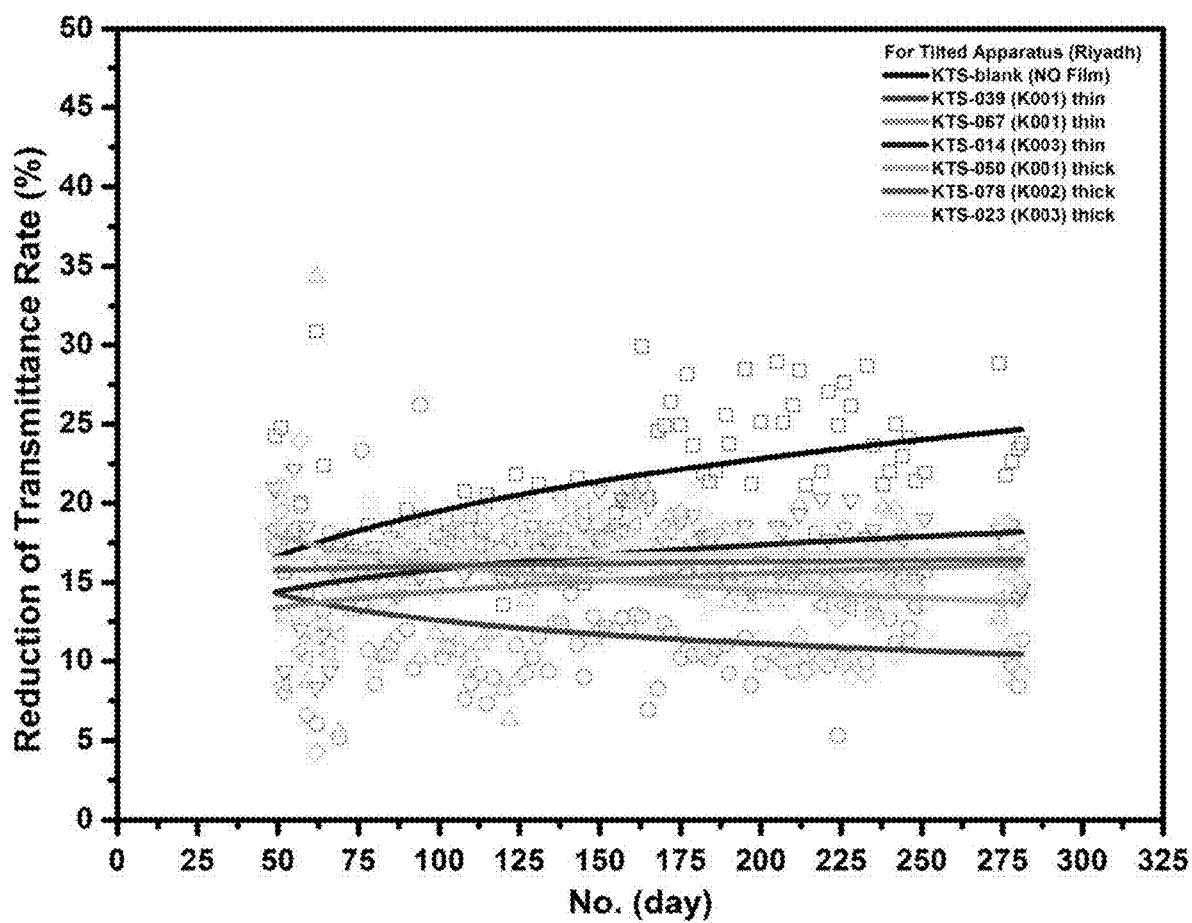
FIG. 6 represents light meter readings (Tilted, 24°) of coated and uncoated samples during nearly one year of exposure.

FIG. 5 represents light meter readings (Upright, 90°) of coated and uncoated samples during nearly one year of exposure. FIG. 6 represents light meter readings (Tilted, 24°) of coated and uncoated samples during nearly one year of exposure. The light meter readings show significant differences between coated and uncoated samples. The uncoated samples have a significant reduction of transmittance compared to the coated samples.

FIG. 7 illustrates sample layout on a test stand during transmission measurement by a Diode-Array Spectrometer. The coated and uncoated samples respectively were cut out as a stripe 5 cm×30 cm (red dot marks the cutting line) to be analyzed with a UV/Vis spectrometer. The blue frame shows the coated samples. Each cut-out stripe was measured for transmission on several measurement spots as shown FIG. 7. FIG. 8 tabulates an overview of the transmission measurements evaluated by T-v acc. EN410/ISO 9050:2003. T_Vis columns are marked blue and relevant samples are marked with blue frame.

Various embodiments of the invention provide a dust repellant and anti-reflective inorganic coating reduces the amount of dust deposition on the surface of substrates such as glasses. The performance of the glasses increases significantly. The cleaning effort for windows and other claddings is reduced, visual transmission (architectural glazing) becomes better, the output of photovoltaic modules increases, and the performance of solar-thermal (water heaters, desalination plants) is enhanced. Field tests reveal that the dust repellant and anti-reflective inorganic coating on a substrate leads to around 10% better transmittance compared to uncoated substrates. The process to prepare the dust repellant and anti-reflective inorganic coating is also a cheaper and efficient.

Various embodiments of the invention can be implemented in wide range of applications such as, but not limited to, architectural, photovoltaic and solar thermal applications, and automotive applications including windshields and mirrors. In addition to these established applications, there are numerous opportunities for developing future products. Examples of such developing products are electrochromic glass for active windows; self-cleaning glass; and antireflective (AR) glass that is conductive, contrast enhancing, or for large area displays, and AR architectural glass.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A dust repellant and anti-reflective inorganic coating comprising a nano-porous silica network of a plurality of silica nanoparticles of 5 nanometer (nm) to 35 nm, wherein the dust repellant and anti-reflective inorganic coating is characterized by cracks; and wherein the cracks are 0.3 micrometer (μm) to 3 μm in length and 0.01 μm to 0.05 μm in width to impart an anti-reflective property to the coating.

2. A method of preparing a dust repellant and anti-reflective inorganic coating on a substrate, the method comprising:

mixing an aqueous silica ($SiCO_2$) solution with a solvent, wherein the aqueous silica solution comprises silica of 5 nm to 35 nm in size;

stirring the aqueous $SiCO_2$ solution with the solvent to form a solution;

coating the solution on the substrate to form a film on the surface of the substrate;

annealing the film by heating the film to a temperature of 500 degree Celsius (° C.) to 700° C. within a period of 2 minutes to 2 hours to create cracks 0.3 micrometer (μm) to 3.0 μm in length and 0.01 μm to 0.05 μm in width to impart an anti-reflective property to the film; and allowing the film to cool down.

3. The method of claim 2, wherein the substrate is glass.

4. The method of claim 2, wherein the solvent is selected from a group of water, methanol, ethanol, 2-propanol, n-propanol, 2-methoxythanol, 2-ethoxyethanol, 2-butoxyethanol, 1-methoxy-2-propanol, acetone, 4-Methyl-2-pentanone.

5. The method of claim 2, wherein the aqueous $SiCO_2$ solution with the solvent is stirred to form the solution for period of at least 1 hour.

6. The method of claim 2, wherein the solution is coated on the substrate to form the film on the surface of the substrate using a dip coating technique.

7. The method of claim 2, wherein the film is allowed to cool down to a temperature of 24° C. to 27° C.

8. The method of claim 2, wherein the film is allowed to cool down after holding the film at a temperature 500° C. to 700° C. for a period of 2 minutes to 60 minutes.

* * * * *